United States Patent
Rajan et al.

(10) Patent No.: US 12,490,493 B2
(45) Date of Patent: Dec. 2, 2025

(54) SEMICONDUCTOR DEVICES WITH A COMPOSITIONALLY GRADED LAYER, AND METHODS OF MAKING AND USE THEREOF

(71) Applicant: Ohio State Innovation Foundation, Columbus, OH (US)

(72) Inventors: Siddharth Rajan, Columbus, OH (US); Sushovan Dhara, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 397 days.

(21) Appl. No.: 18/143,191

(22) Filed: May 4, 2023

(65) Prior Publication Data
US 2024/0014285 A1    Jan. 11, 2024

Related U.S. Application Data

(60) Provisional application No. 63/358,288, filed on Jul. 5, 2022.

(51) Int. Cl.
| H10D 64/64 | (2025.01) |
| H10D 62/80 | (2025.01) |
| H10D 64/62 | (2025.01) |

(52) U.S. Cl.
CPC ............ *H10D 64/64* (2025.01); *H10D 62/80* (2025.01); *H10D 64/62* (2025.01)

(58) Field of Classification Search
CPC ........ H10D 64/62; H10D 64/64; H10D 62/80; H10D 64/647; H10D 64/649; H10D 8/60; H10D 62/00
USPC .......................................................... 257/76
See application file for complete search history.

(56) References Cited

U.S. PATENT DOCUMENTS

2005/0184320 A1 * 8/2005 Green ..................... H10F 30/29
257/290

OTHER PUBLICATIONS

Sundaram PP et al. β-(AlxGa1-x)2O3/Ga2O3 heterostructure Schotlky diodes for improved VBR2/RON, J. Vac. Sci. Technol. A 2022, 40, 043211.

* cited by examiner

*Primary Examiner* — Monica D Harrison
(74) *Attorney, Agent, or Firm* — Meunier Carlin & Curfman LLC (57) ABSTRACT

Disclosed herein are semiconductor devices with a compositionally graded layer, and methods of making and use thereof.

19 Claims, 7 Drawing Sheets

SEMICONDUCTOR DEVICES WITH A COMPOSITIONALLY GRADED LAYER, AND METHODS OF MAKING AND USE THEREOF

CROSS-REFERENCE TO RELATED APPLICATIONS

This application claims the benefit of priority to U.S. Provisional Application No. 63/358,288 filed Jul. 5, 2022, which is hereby incorporated herein by reference in its entirety.

STATEMENT OF GOVERNMENT SUPPORT

This invention was made with government support under grant/contract number FA9550-18-1-0479 awarded by the Air Force Office of Scientific Research and grant/contract number DE-NA0003921 awarded by the Department of Energy. The government has certain rights in the invention.

BACKGROUND $Ga_2O_3$ is an attractive material for a variety of electronic devices. However, the reverse breakdown field of $\beta$-$Ga_2O_3$ Schottky junctions is limited due to tunneling current. Compositions, methods, and devices with improved properties are needed. The compositions, methods, and devices discussed herein addresses these and other needs.

SUMMARY

In accordance with the purposes of the disclosed compositions, methods, and devices as embodied and broadly described herein, the disclosed subject matter relates to devices and methods of making and use thereof. For example, disclosed herein are semiconductor devices with a compositionally graded layer, and methods of making and use thereof.

For example, disclosed herein are devices comprising: a first electrode layer; a first semiconductor layer comprising a first semiconductor material having a first bandgap; a second semiconductor layer having a top surface, a bottom surface, and a thickness, the thickness being the average dimension from the top surface to the bottom surface; wherein the second semiconductor layer comprises a second semiconductor material that varies across the thickness from the bottom surface to the top surface, such that the second semiconductor material has a compositional gradient with thickness from an initial composition having an initial band gap at the bottom surface to a final comparison having a final bandgap at the top surface, such that the second semiconductor layer has a bandgap that varies with thickness from an initial bandgap at the bottom surface to a final bandgap at the top surface, wherein the final bandgap is greater than the initial bandgap, and the final bandgap is greater than the first bandgap; an optional dielectric layer; and a second electrode layer. The first semiconductor layer is disposed on top of and in physical contact with the first electrode layer; the second semiconductor layer is disposed on top of and in physical contact with the first semiconductor layer, such that bottom surface of the second semiconductor layer is disposed on and in physical contact with the first semiconductor layer and the first semiconductor layer is disposed between and in physical contact with the first electrode layer and bottom surface of the second semiconductor layer. When the optional dielectric layer is present, then: the optional dielectric layer is disposed on top of an in physical contact with the second semiconductor layer, such that the second semiconductor layer is disposed between and in physical contact with the first electrode layer and the optional dielectric layer, the top surface of the second semiconductor layer being in physical contact with the optional dielectric layer and the bottom surface of the second semiconductor layer being in physical contact with the first semiconductor layer; and the second electrode layer is disposed on top of and in physical contact with the optional dielectric layer, such that the optional dielectric layer is disposed between and in physical contact with the second electrode layer and the second semiconductor layer. When the optional dielectric layer is absent, then: the second electrode layer is disposed on top of an in physical contact with the second semiconductor layer, such that the second semiconductor layer is disposed between and in physical contact with the second electrode layer and the first semiconductor layer, the top surface of the second semiconductor layer being in physical contact with the second electrode layer and the bottom surface of the second electrode layer being in physical contact with the first semiconductor layer.

In some examples, the first electrode layer comprises a Schottky contact layer. In some examples, the first electrode layer comprises a metal selected from the group consisting of Au, Pt, Pd, Ni, Mo, Cr, W, Zr, Pb, Ag, Al, Ti, Bi, or a combination thereof. In some examples, the first electrode layer comprises a metal selected from the group consisting of Ti, Au, or a combination thereof. In some examples, the first electrode layer has an average thickness of from 1 nm to 20 μm.

In some examples, the first semiconductor material comprises $Ga_2O_3$, GaN, SiC, SnO, InP, or a combination thereof. In some examples, the first semiconductor material comprises $Ga_2O_3$. In some examples, the first semiconductor layer further comprises a first dopant. In some examples, the first semiconductor layer has an average thickness of from 1 nm to 500 μm, from 1 nm to 100 μm, from 1 nm to 20 μm, or from 1 nm to 1 μm.

In some examples, the second semiconductor material comprises $(Al_xGa_{1-x})_2O_3$ wherein x is from 0 to 1. In some examples, x varies along the thickness the second semiconductor material from a first value to a second value, the second value being greater than the first value. In some examples, the compositional gradient of the second semiconductor material comprises a linear gradient, a stepped gradient, an exponential gradient, a logarithmic gradient, etc., or a combination thereof. In some examples, the second semiconductor layer further comprises a second dopant. In some examples, the thickness of the second semiconductor layer is from 1 nm to 1000 nm, from 1 nm to 500 nm, or from 1 nm to 100 nm.

In some examples, the optional dielectric layer is present. In some examples, the optional dielectric layer has an average thickness of from 1 nm to 20 μm, from 1 nm to 1 μm, or from 1 nm to 100 nm. In some examples, the optional dielectric layer comprises $BaTiO_3$.

In some examples, the optional dielectric layer is absent.

In some examples, the second electrode layer comprises an Ohmic contact layer. In some examples, the second electrode layer comprises Ni, Au, Ag, Ti, Al, Pt, Pd, Bi, Al, Al—Si, $TiSi_2$, TiN, W, $MoSi_2$, PtSi, $CoSi_2$, $WSi_2$, In, AuGa, AuSb, Mo, $InSnO_2$, or a combination thereof. In some examples, the second electrode layer comprises Ni, Au, or a combination thereof. In some examples, the second electrode layer comprises Pt, Au, or a combination thereof. In some examples, the second electrode layer has an average thickness of from 1 nm to 20 μm, from 1 nm to 10 μm, or from 1 nm to 1 μm.

Also disclosed herein are methods of making any of the devices disclosed herein. In some examples, the method comprises depositing, in any order, the first electrode layer, the first semiconductor layer, the second semiconductor layer, the optional dielectric layer (when present), and the second electrode layer. In some examples, depositing the first electrode layer, the first semiconductor layer, the second semiconductor layer, the optional dielectric layer (when present), and the second electrode layer each independently comprises electroplating, lithographic deposition, electron beam deposition, thermal deposition, spin coating, drop-casting, zone casting, dip coating, blade coating, spraying, vacuum filtration, chemical vapor deposition (CVD), atomic layer deposition (ALD), physical vapor deposition (PVD), sputtering, pulsed laser deposition, molecular beam epitaxy, evaporation, three-dimensional (3D) particle printing such as aerosol jet printing, metalorganic chemical vapor deposition (MOCVD), molecular beam epitaxy (MBE), pulsed laser deposition (PLD), Hydride Vapor Phase Epitaxy (HVPE), melt growth, or a combination thereof.

Also disclosed herein are methods of use of any of the devices disclosed herein.

Also disclosed herein are devices comprising: a first layer comprising n-type doped $Ga_2O_3$, a second layer comprising $(Al_xGa_{1-x})_2O_3$ which is compositionally graded from zero Al-composition to high Al-composition over a thickness <1 μm, a third layer comprising a rectifying anode metal contact layer on the compositionally graded layer, and a cathode metal contact made to the n-type doped $Ga_2O_3$ layer, wherein the Schottky barrier height to the second layer is higher than the height that would have been achieved on the first layer. In some examples, a dielectric is inserted between the compositionally graded layer and the metal layer. In some examples, the first layer comprises any other semiconductor such as GaN, SiC, ZnO, InP, and the second layer is appropriately graded to go from lower bandgap to higher bandgap. In some examples, the compositional grading comprises linear grading, stepped grading, exponential grading, logarithmic grading, etc., or a combination thereof. In some examples, the first and second layer of semiconductors can be doped or undoped.

Additional advantages of the disclosed compositions, devices, and methods will be set forth in part in the description which follows, and in part will be obvious from the description. The advantages of the disclosed compositions, devices, and methods will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

The compositions, methods, and devices described herein may be understood more readily by reference to the following detailed description of specific aspects of the disclosed subject matter and the Examples included therein.

Before the present compositions, methods, and devices are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Values can be expressed herein as an "average" value. "Average" generally refers to the statistical mean value.

By "substantially" is meant within 5%, e.g., within 4%, 3%, 2%, or 1%.

"Exemplary" means "an example of" and is not intended to convey an indication of a preferred or ideal embodiment. "Such as" is not used in a restrictive sense, but for explanatory purposes.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Figure 1:
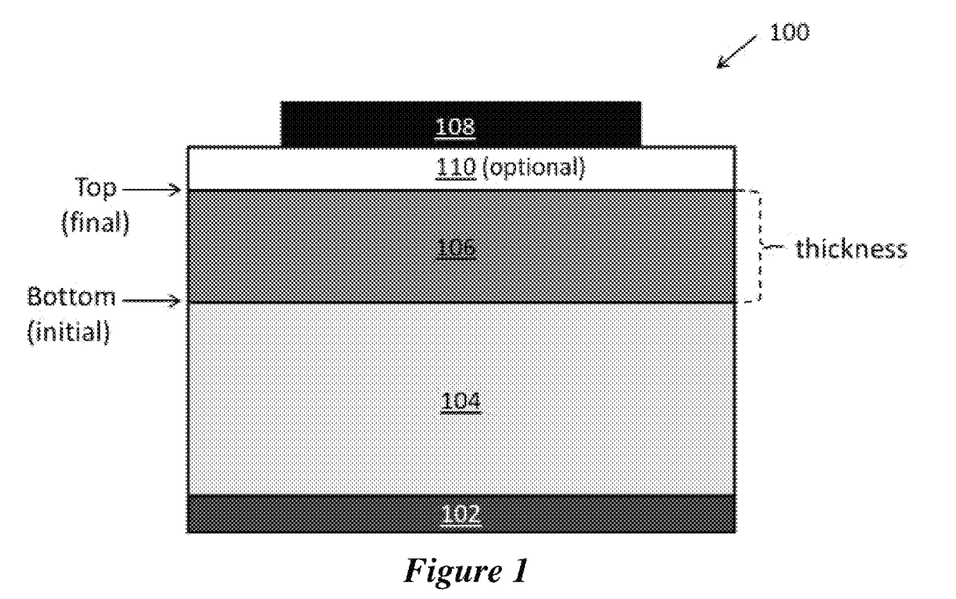
FIG. 1 is a schematic cross-sectional view of an example device as disclosed herein according to one implementation.
Figure 2:
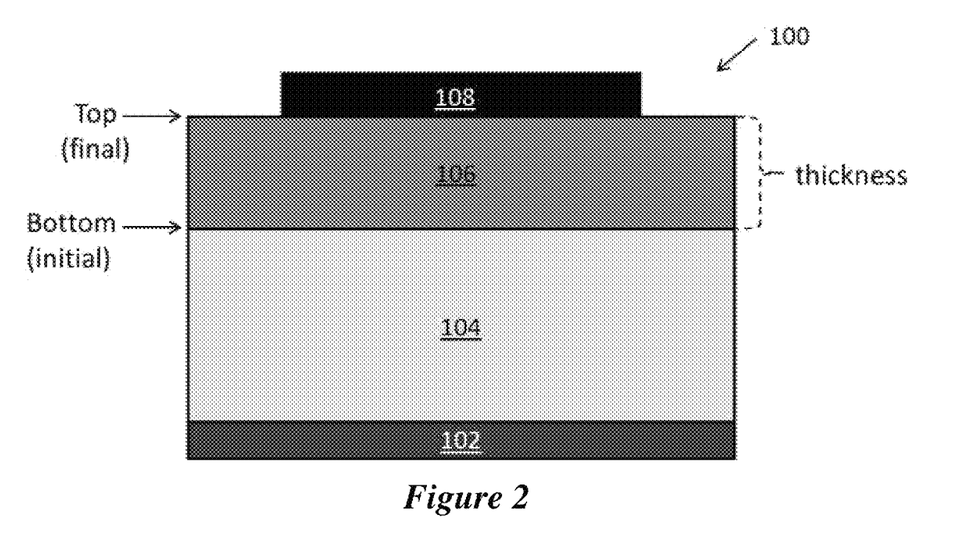
FIG. 2 is a schematic cross-sectional view of an example device as disclosed herein according to one implementation.

Referring now to FIG. 1 and FIG. 2, disclosed herein are devices 100 comprising: a first electrode layer 102; a first semiconductor layer 104 comprising a first semiconductor material having a first bandgap; a second semiconductor layer 106 having a top surface, a bottom surface, and a thickness, the thickness being the average dimension from the top surface to the bottom surface; an optional dielectric layer 110; and a second electrode layer 108.

The second semiconductor layer 106 comprises a second semiconductor material that varies across the thickness from the bottom surface to the top surface, such that the second semiconductor material has a compositional gradient with thickness from an initial composition having an initial band gap at the bottom surface to a final comparison having a final bandgap at the top surface, such that the second semiconductor layer 106 has a bandgap that varies with thickness from an initial bandgap at the bottom surface to a final bandgap at the top surface, wherein the final bandgap is greater than the initial bandgap, and the final bandgap is greater than the first bandgap.

The first semiconductor layer 104 is disposed on top of and in physical contact with the first electrode layer 102. The second semiconductor layer 106 is disposed on top of and in physical contact with the first semiconductor layer 104, such that bottom surface of the second semiconductor layer 106 is disposed on and in physical contact with the first semiconductor layer 104 and the first semiconductor layer 104 is disposed between and in physical contact with the first electrode layer 102 and bottom surface of the second semiconductor layer 106.

When the optional dielectric layer 110 is present, then the optional dielectric layer 110 is disposed on top of an in physical contact with the second semiconductor layer 106, such that the second semiconductor layer 106 is disposed between and in physical contact with the first electrode layer 102 and the optional dielectric layer 110, the top surface of the second semiconductor layer 106 being in physical contact with the optional dielectric layer 110 and the bottom surface of the second semiconductor layer 106 being in physical contact with the first semiconductor layer 104; and the second electrode layer 108 is disposed on top of and in physical contact with the optional dielectric layer 110, such that the optional dielectric layer 110 is disposed between and in physical contact with the second electrode layer 108 and the second semiconductor layer 106.

When the optional dielectric layer 110 is absent, then the second electrode layer 108 is disposed on top of an in physical contact with the second semiconductor layer 106, such that the second semiconductor layer 106 is disposed between and in physical contact with the second electrode layer 108 and the first semiconductor layer 104, the top surface of the second semiconductor layer 106 being in physical contact with the second electrode layer 108 and the bottom surface of the second electrode layer 108 being in physical contact with the first semiconductor layer 104.

The first electrode layer 102 can comprise any suitable material such as those known in the art. In some examples, the first electrode layer 102 comprises a Schottky contact layer.

In some examples, the first electrode layer 102 comprises a metal selected from the group consisting of Au, Pt, Pd, Ni, Mo, Cr, W, Zr, Pb, Ag, Al, Ti, Bi, or a combination thereof. In some examples, the first electrode layer 102 comprises a metal selected from the group consisting of Ti, Au, or a combination thereof.

In some examples, the first electrode layer 102 has an average thickness of 1 nanometer (nm) or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (μm, micron) or more, 1.25 μm or more, 1.5 μm or more, 1.75 μm or more, 2 μm or more, 2.25 μm or more, 2.5 μm or more, 3 μm or more, 3.5 μm or more, 4 μm or more, 4.5 µm or more, 5 µm or more, 6 µm or more, 7 µm or more, 8 µm or more, 9 µm or more, 10 µm or more, 11 µm or more, 12 µm or more, 13 µm or more, 14 µm or more, 15 µm or more, 16 µm or more, 17 µm or more, 18 µm or more, or 19 µm or more). In some examples, the first electrode layer 102 can have an average thickness to 20 micrometers (µm, microns) or less (e.g., 19 µm or less, 18 µm or less, 17 µm or less, 16 µm or less, 15 µm or less, 14 µm or less, 13 µm or less, 12 µm or less, 11 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2.25 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, or 2 nm or less). The average thickness of the first electrode layer 102 can range from any of the minimum values described above to any of the maximum values described above. For example, the first electrode layer 102 can have an average thickness of from 1 nm to 20 µm (e.g., from 1 nm to 750 nm, from 750 nm to 20 µm, from 1 nm to 100 nm, from 100 nm to 1 µm, from 1 µm to 20 µm, from 1 nm to 15 µm, from 1 nm to 10 µm, from 1 nm to 5 µm, from 1 nm to 1 µm, from 1 nm to 750 nm, from 1 nm to 500 nm, from 1 nm to 250 nm, from 10 nm to 20 µm, from 25 nm to 20 µm, from 50 nm to 20 µm, from 75 nm to 20 µm, from 100 nm to 20 µm, from 250 nm to 20 µm, from 500 nm to 20 µm, from 750 nm to 20 µm, from 1 µm to 20 µm, from 5 µm to 20 µm, from 10 µm to 20 µm, from 10 nm to 15 µm, from 50 nm to 10 µm, from 75 nm to 5 µm, or from 100 nm to 1 µm). The average thickness of the first electrode layer 102 can be measured using methods known in the art, such as, for example, atomic force microscopy or electron microscopy.

The first semiconductor material can comprise any suitable material. In some examples, the first semiconductor material comprises $Ga_2O_3$, GaN, SiC, SnO, InP, or a combination thereof. In some examples, the first semiconductor material comprises $Ga_2O_3$. In some examples, the first semiconductor material comprises $\beta$—$Ga_2O_3$. In some examples, the first semiconductor layer 104 further comprises a first dopant.

In some examples, the first semiconductor layer 104 has an average thickness of 1 nanometer (nm) or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 600 nm or more, 700 nm or more, 800 nm or more, 900 nm or more, 1 micrometer (µm, micron) or more, 1.25 µm or more, 1.5 µm or more, 1.75 µm or more, 2 µm or more, 2.25 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 15 µm or more, 20 µm or more, 25 µm or more, 30 µm or more, 35 µm or more, 40 µm or more, 45 µm or more, 50 µm or more, 60 µm or more, 70 µm or more, 80 µm or more, 90 µm or more, 100 µm or more, 125 µm or more, 150 µm or more, 175 µm or more, 200 µm or more, 225 µm or more, 250 µm or more, 300 µm or more, 350 µm or more, 400 µm or more, or 450 µm or more). In some examples, the first semiconductor layer 104 has an average thickness of 50 nm or more. In some examples, the first semiconductor layer 104 has an average thickness of 500 µm or less (e.g., 450 µm or less, 400 µm or less, 350 µm or less, 300 µm or less, 250 µm or less, 225 µm or less, 200 µm or less, 175 µm or less, 150 µm or less, 125 µm or less, 100 µm or less, 90 µm or less, 80 µm or less, 70 µm or less, 60 µm or less, 50 µm or less, 45 µm or less, 40 µm or less, 35 µm or less, 30 µm or less, 25 µm or less, 20 µm or less, 15 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2.25 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, or 2 nm or less). The average thickness of the first semiconductor layer 104 can range from any of the minimum values described above to any of the maximum values described above. For example, the first semiconductor layer 104 can have an average thickness of from 1 nm to 500 µm (e.g., from 1 nm to 1 µm, from 1 nm to 50 µm, from 1 nm to 500 nm, from 500 nm to 5 µm, from 5 µm to 50 µm, from 1 nm to 40 µm, from 1 nm to 30 µm, from 1 nm to 25 µm, from 1 nm to 20 µm, from 1 nm to 15 µm, from 1 nm to 10 µm, from 1 nm to 5 µm, from 1 nm to 1 µm, from 1 nm to 750 nm, from 1 nm to 500 nm, from 1 nm to 250 nm, from 1 nm to 175 nm, from 1 nm to 100 nm, from 1 nm to 50 nm, from 10 nm to 50 µm, from 25 nm to 50 µm, from 50 nm to 50 µm, from 75 nm to 50 µm, from 100 nm to 50 µm, from 175 nm to 50 µm, from 250 nm to 50 µm, from 500 nm to 50 µm, from 750 nm to 50 µm, from 1 µm to 50 µm, from 5 µm to 50 µm, from 10 µm to 50 µm, from 15 µm to 50 µm, from 20 µm to 50 µm, from 25 µm to 50 µm, from 10 nm to 40 µm, from 25 nm to 25 µm, or from 50 nm to 10 µm, from 1 nm to 100 µm, from 1 nm to 20 µm, or from 1 nm to 1 µm). In some examples, the first semiconductor layer 104 can have an average thickness of from 1 nm to 4 µm. In some examples, the first semiconductor layer 104 can have an average thickness of from 6 µm to 500 µm.

In some examples, the first semiconductor layer 104 comprises $Ga_2O_3$ and has an average thickness of from 1 nm to 4 µm or from 50 nm to 4 µm. In some examples, the first semiconductor layer 104 comprises $Ga_2O_3$ and has an average thickness of from 6 µm to 500 µm.

In some examples, the second semiconductor material comprises $(Al_xGa_{1-x})_2O_3$ wherein x is from 0 to 1.

For example, x can be 0 or more (e.g., 0.05 or more, 0.1 or more, 0.15 or more, 0.2 or more, 0.25 or more, 0.3 or more, 0.35 or more, 0.4 or more, 0.45 or more, 0.5 or more, 0.55 or more, 0.6 or more, 0.65 or more, 0.7 or more, 0.75 or more, 0.8 or more, 0.85 or more, 0.9 or more, or 0.95 or more). In some examples, x can be 1 or less (e.g., 0.95 or less, 0.9 or less, 0.85 or less, 0.8 or less, 0.75 or less, 0.7 or less, 0.65 or less, 0.6 or less, 0.65 or less, 0.5 or less, 0.55 or less, 0.4 or less, 0.45 or less, 0.3 or less, 0.35 or less, 0.2 or less, 0.25 or less, or 0.1 or less). The value of x can range from any of the minimum values described above to any of the maximum values described above. For example, x can be from 0 to 1 (e.g., from 0 to 0.5, from 0.5 to 1, from 0 to 0.2, from 0.2 to 0.4, from 0.4 to 0.6, from 0.6 to 0.8, from 0.8 to 1, from 0 to 0.95, from 0 to 0.9, from 0 to 0.85, from 0 to 0.8, from 0 to 0.75, from 0 to 0.7, from 0 to 0.65, from 0 to 0.6, from 0 to 0.55, from 0 to 0.5, from 0 to 0.45, from 0 to 0.4, from 0 to 0.35, from 0 to 0.3, from 0 to 0.25, from 0 to 0.2, from 0 to 0.15, from 0 to 0.1, from 0.1 to 1, from 0.15 to 1, from 0.2 to 1, from 0.25 to 1, from 0.3 to 1, from 0.35 to 1, from 0.4 to 1, from 0.45 to 1, from 0.5 to 1, from 0.55 to 1, from 0.6 to 1, from 0.65 to 1, from 0.7 to 1, from 0.75 to 1, from 0.8 to 1, from 0.85 to 1, from 0.9 to 1, from 0.1 to 0.9, from 0.2 to 0.8, from 0.3 to 0.7, or from 0.4 to 0.6). In some examples, the second semiconductor material comprises $(Al_xGa_{1-x})_2O_3$ wherein x is from 0.25 to 1. In some examples, x varies along the thickness the second semiconductor layer 106 from a first value to a second value, the second value being greater than the first value.

In some examples, the compositional gradient of the second semiconductor material comprises a linear gradient, a stepped gradient, an exponential gradient, a logarithmic gradient, etc., or a combination thereof. In some examples, the compositional gradient of the second semiconductor material comprises a linear gradient, an exponential gradient, a logarithmic gradient, etc., or a combination thereof. In some examples, the compositional gradient of the second semiconductor material comprises an exponential gradient, a logarithmic gradient, etc., or a combination thereof.

In some examples, the second semiconductor material comprises $(Al_xGa_{1-x})_2O_3$ wherein x is from 0 to 1 and the compositional gradient of the second semiconductor material comprises a linear gradient, an exponential gradient, a logarithmic gradient, etc., or a combination thereof. In some examples, the second semiconductor material comprises $(Al_xGa_{1-x})_2O_3$ wherein x is from 0 to 1 and the compositional gradient of the second semiconductor material comprises an exponential gradient, a logarithmic gradient, etc., or a combination thereof.

In some examples, the second semiconductor layer 106 further comprises a second dopant.

In some examples, the thickness of the second semiconductor layer 106 is 1 nanometer (nm) or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 550 nm or more, 600 nm or more, 650 nm or more, 700 nm or more, 750 nm or more, 800 nm or more, 850 nm or more, 900 nm or more, or 950 nm or more). In some examples, the thickness of the second semiconductor layer 106 is 1 micrometer (μm, micron) or less (e.g., 950 nm or less, 900 nm or less, 850 nm or less, 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, or 2 nm or less). The thickness of the second semiconductor layer 106 can range from any of the minimum values described above to any of the maximum values described above. For example, the thickness of the second semiconductor layer 106 can be from 1 nm to 1 μm (e.g., from 1 nm to 500 nm, from 500 nm to 1000 nm, from 1 nm to 200 nm, from 200 nm to 400 nm, from 400 nm to 600 nm, from 600 nm to 800 nm, from 800 nm to 1000 nm, from 1 nm to 900 nm, from 1 nm to 800 nm, from 1 nm to 700 nm, from 1 nm to 600 nm, from 1 nm to 500 nm, from 1 nm to 400 nm, from 1 nm to 300 nm, from 1 nm to 200 nm, from 1 nm to 100 nm, from 1 nm to 50 nm, from 1 nm to 25 nm, from 5 nm to 1000 nm, from 10 nm to 1000 nm, from 25 nm to 1000 nm, from 30 nm to 1000 nm, from 35 nm to 1000 nm, from 40 nm to 1000 nm, from 50 nm to 1000 nm, from 75 nm to 1000 nm, from 100 nm to 1000 nm, from 200 nm to 1000 nm, from 300 nm to 1000 nm, from 400 nm to 1000 nm, from 500 nm to 1000 nm, from 600 nm to 1000 nm, from 700 nm to 1000 nm, from 800 nm to 1000 nm, from 900 nm to 1000 nm, from 5 nm to 950 nm, from 10 nm to 900 nm, from 1 nm to 500 nm, or from 1 nm to 100 nm). In some example, the thickness of the second semiconductor layer 106 can be from 40 nm to 1 μm. The thickness of the second semiconductor layer 106 can be measured using methods known in the art, such as, for example, atomic force microscopy or electron microscopy.

In some examples, the second semiconductor material comprises $(Al_xGa_{1-x})_2O_3$ wherein x is from 0 to 1 and has a thickness from 40 nm to 1 μm.

In some examples, the second semiconductor material comprises $(Al_xGa_{1-x})_2O_3$ wherein x is from 0 to 1 and has a thickness from 40 nm to 1 μm and the compositional gradient of the second semiconductor material comprises a linear gradient, an exponential gradient, a logarithmic gradient, etc., or a combination thereof. In some examples, the second semiconductor material comprises $(Al_xGa_{1-x})_2O_3$ wherein x is from 0 to 1 and has a thickness from 40 nm to 1 μm and the compositional gradient of the second semiconductor material comprises an exponential gradient, a logarithmic gradient, etc., or a combination thereof.

In some examples, the Schottky barrier height to the second semiconductor layer is higher than the Schottky barrier height that would have been achieved on the first semiconductor layer (e.g., in the absence of the second semiconductor layer).

In some examples, the optional dielectric layer 110 is present. The optional dielectric layer 110 when present can comprise any suitable dielectric material. In some examples, the optional dielectric layer 110 comprises $BaTiO_3$.

In some examples, the optional dielectric layer 110 has an average thickness of 1 nanometer (nm) or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (μm, micron) or more, 1.25 μm or more, 1.5 μm or more, 1.75 μm or more, 2 μm or more, 2.25 μm or more, 2.5 μm or more, 3 μm or more, 3.5 μm or more, 4 μm or more, 4.5 μm or more, 5 μm or more, 6 μm or more, 7 μm or more, 8 µm or more, 9 µm or more, 10 µm or more, 11 µm or more, 12 µm or more, 13 µm or more, 14 µm or more, 15 µm or more, 16 µm or more, 17 µm or more, 18 µm or more, or 19 µm or more). In some examples, the optional dielectric layer 110 can have an average thickness to 20 micrometers (µm, microns) or less (e.g., 19 µm or less, 18 µm or less, 17 µm or less, 16 µm or less, 15 µm or less, 14 µm or less, 13 µm or less, 12 µm or less, 11 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2.25 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, or 2 nm or less). In some examples, the optional dielectric layer 110 can have an average thickness of 1 micrometer or less. The average thickness of the optional dielectric layer 110 can range from any of the minimum values described above to any of the maximum values described above. For example, the optional dielectric layer 110 can have an average thickness of from 1 nm to 20 µm (e.g., from 1 nm to 750 nm, from 750 nm to 20 µm, from 1 nm to 100 nm, from 100 nm to 1 µm, from 1 µm to 20 µm, from 1 nm to 15 µm, from 1 nm to 10 µm, from 1 nm to 5 µm, from 1 nm to 1 µm, from 1 nm to 750 nm, from 1 nm to 500 nm, from 1 nm to 250 nm, from 10 nm to 20 µm, from 25 nm to 20 µm, from 50 nm to 20 µm, from 75 nm to 20 µm, from 100 nm to 20 µm, from 250 nm to 20 µm, from 500 nm to 20 µm, from 750 nm to 20 µm, from 1 µm to 20 µm, from 5 µm to 20 µm, from 10 µm to 20 µm, from 10 nm to 15 µm, from 50 nm to 10 µm, from 75 nm to 5 µm, from 100 nm to 1 µm, from 1 nm to 1 µm, or from 1 nm to 100 nm). The average thickness of the optional dielectric layer 110 can be measured using methods known in the art, such as, for example, atomic force microscopy or electron microscopy.

In some examples, the optional dielectric layer 110 comprises $BaTiO_3$ and has an average thickness of from 1 nm to 20 µm. In some examples, the optional dielectric layer 110 comprises $BaTiO_3$ and has an average thickness of 1 µm or less.

In some examples, the optional dielectric layer 110 is absent.

In some examples, the second electrode layer 108 comprises an Ohmic contact layer. In some examples, the second electrode layer 108 comprises Ni, Au, Ag, Ti, Al, Pt, Pd, Bi, Al, Al—Si, $TiSi_2$, TiN, W, $MoSi_2$, PtSi, $CoSi_2$, $WSi_2$, In, AuGa, AuSb, Mo, $InSnO_2$, or a combination thereof. In some examples, the second electrode layer 108 comprises Ni, Au, or a combination thereof. In some examples, the second electrode layer 108 comprises Pt, Au, or a combination thereof.

In some examples, the second electrode layer 108 has an average thickness of 1 nanometer (nm) or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (µm, micron) or more, 1.25 µm or more, 1.5 µm or more, 1.75 µm or more, 2 µm or more, 2.25 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 11 µm or more, 12 µm or more, 13 µm or more, 14 µm or more, 15 µm or more, 16 µm or more, 17 µm or more, 18 µm or more, or 19 µm or more). In some examples, the second electrode layer 108 can have an average thickness to 20 micrometers (µm, microns) or less (e.g., 19 µm or less, 18 µm or less, 17 µm or less, 16 µm or less, 15 µm or less, 14 µm or less, 13 µm or less, 12 µm or less, 11 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2.25 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, or 2 nm or less). The average thickness of the second electrode layer 108 can range from any of the minimum values described above to any of the maximum values described above. For example, the second electrode layer 108 can have an average thickness of from 1 nm to 20 µm (e.g., from 1 nm to 750 nm, from 750 nm to 20 µm, from 1 nm to 100 nm, from 100 nm to 1 µm, from 1 µm to 20 µm, from 1 nm to 15 µm, from 1 nm to 10 µm, from 1 nm to 5 µm, from 1 nm to 1 µm, from 1 nm to 750 nm, from 1 nm to 500 nm, from 1 nm to 250 nm, from 10 nm to 20 µm, from 25 nm to 20 µm, from 50 nm to 20 µm, from 75 nm to 20 µm, from 100 nm to 20 µm, from 250 nm to 20 µm, from 500 nm to 20 µm, from 750 nm to 20 µm, from 1 µm to 20 µm, from 5 µm to 20 µm, from 10 µm to 20 µm, from 10 nm to 15 µm, from 50 nm to 10 µm, from 75 nm to 5 µm, from 100 nm to 1 µm, from 1 nm to 1 µm, or from 1 nm to 1 µm). The average thickness of the second electrode layer 108 can be measured using methods known in the art, such as, for example, atomic force microscopy or electron microscopy.

In some examples, the device can further include a substrate. The substrate, when present, can be disposed between the first semiconductor layer 104 and the first electrode layer 102, such that the substrate is sandwiched between and in contact with the first semiconductor layer 104 and the first electrode layer 102. The substrate can comprise any suitable material. In some examples, the substrate can comprise $Ga_2O_3$.

In some examples, the device including the second semiconductor layer can exhibit improved properties relative to the same device in the absence of the second semiconductor layer. For example, the device can have an improved Schottky barrier height, an improved electric breakdown properties, improved tunneling current, or a combination thereof when the second semiconductor layer is present.

Also disclosed herein are devices comprising: a first layer comprising n-type doped $Ga_2O_3$; a second layer comprising $(Al_xGa_{1-x})_2O_3$ which is compositionally graded from zero Al-composition to high Al-composition over a thickness <1

µm; a third layer comprising a rectifying anode metal contact layer on the compositionally graded layer; and a cathode metal contact made to the n-type doped $Ga_2O_3$ layer; wherein the Schottky barrier height to the second layer is higher than the height that would have been achieved on the first layer. In some examples, a dielectric is inserted between the compositionally graded layer and the metal layer.

In some examples, the first layer comprises any other semiconductor such as GaN, SiC, ZnO, InP, and the second layer is appropriately graded to go from lower bandgap to higher bandgap.

In some examples, the compositional grading comprises linear grading, stepped grading, exponential grading, logarithmic grading, etc., or a combination thereof. In some examples, the first and second layer of semiconductors can be doped or undoped.

Also disclosed herein are methods of making any of the devices disclosed herein. For example, the methods can comprise depositing, in any order, the first electrode layer, the first semiconductor layer, the second semiconductor layer, the optional dielectric layer (when present), and the second electrode layer. In some examples, depositing the first electrode layer, the first semiconductor layer, the second semiconductor layer, the optional dielectric layer (when present), and the second electrode layer each independently comprises electroplating, lithographic deposition, electron beam deposition, thermal deposition, spin coating, dropcasting, zone casting, dip coating, blade coating, spraying, vacuum filtration, chemical vapor deposition (CVD), atomic layer deposition (ALD), physical vapor deposition (PVD), sputtering, pulsed laser deposition, molecular beam epitaxy, evaporation, three-dimensional (3D) particle printing such as aerosol jet printing, metalorganic chemical vapor deposition (MOCVD), molecular beam epitaxy (MBE), pulsed laser deposition (PLD), Hydride Vapor Phase Epitaxy (HVPE), melt growth, or a combination thereof.

In some examples, the methods can comprise, in the following order, depositing the first semiconductor layer on a native $Ga_2O_3$ substrate; optionally depositing, in any order, the second semiconductor layer, the optional dielectric layer (when present), and the second electrode layer; and subsequently transferring the first semiconductor layer (and any other layers present) to a different substrate.

Also disclosed herein are methods of use of any of the devices disclosed herein.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the devices and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Described herein are devices with surface barrier engineering using $(Al_xGa_{1-x})_2O_3/Ga_2O_3$.

In the following description and figures, AlGaO refers to $(Al_xGa_{1-x})_2O_3$ and GaO refers to $Ga_2O_3$.

Reverse breakdown field of Beta-$Ga_2O_3$ Schottky junctions is limited due to tunneling current. By introducing a linearly graded $(Al_xGa_{1-x})_2O_3$ cap layer, Schottky barrier at the surface is increased. Increased tunneling barrier should result in higher breakdown field.

Figure 3:
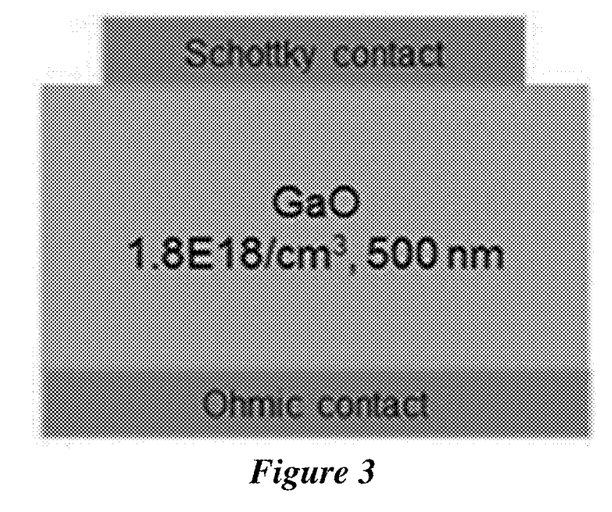
FIG. 3. An example $Ga_2O_3$ device structure.
Figure 4:
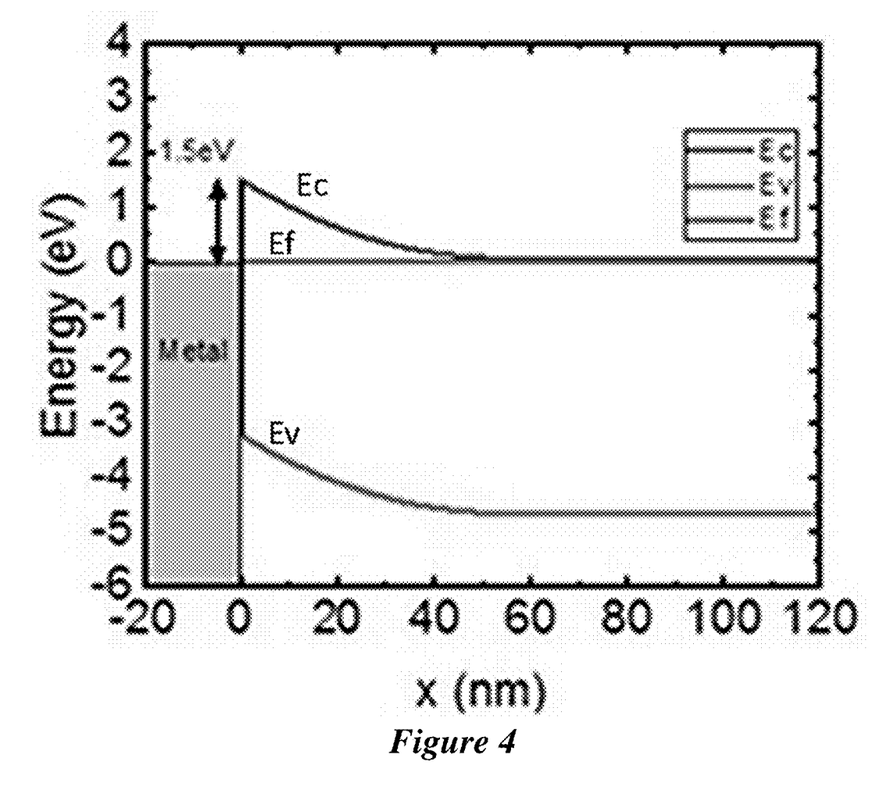
FIG. 4. Band diagram with a 1.5 eV barrier using a $Ga_2O_3$ device as shown in FIG. 3.

An example $Ga_2O_3$ device structure is shown in FIG. 3 with a corresponding band diagram with a 1.5 eV barrier using $Ga_2O_3$ shown in FIG. 4.

Figure 5:
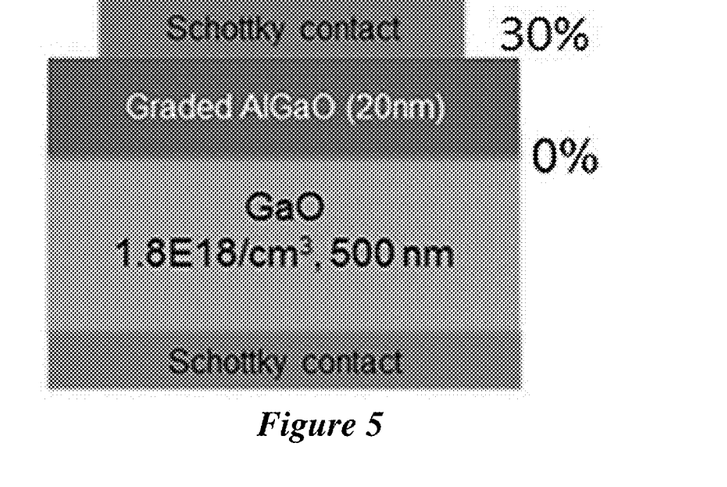
FIG. 5. An example $(Al_xGa_{1-x})_2O_3/Ga_2O_3$ device structure.
Figure 6:
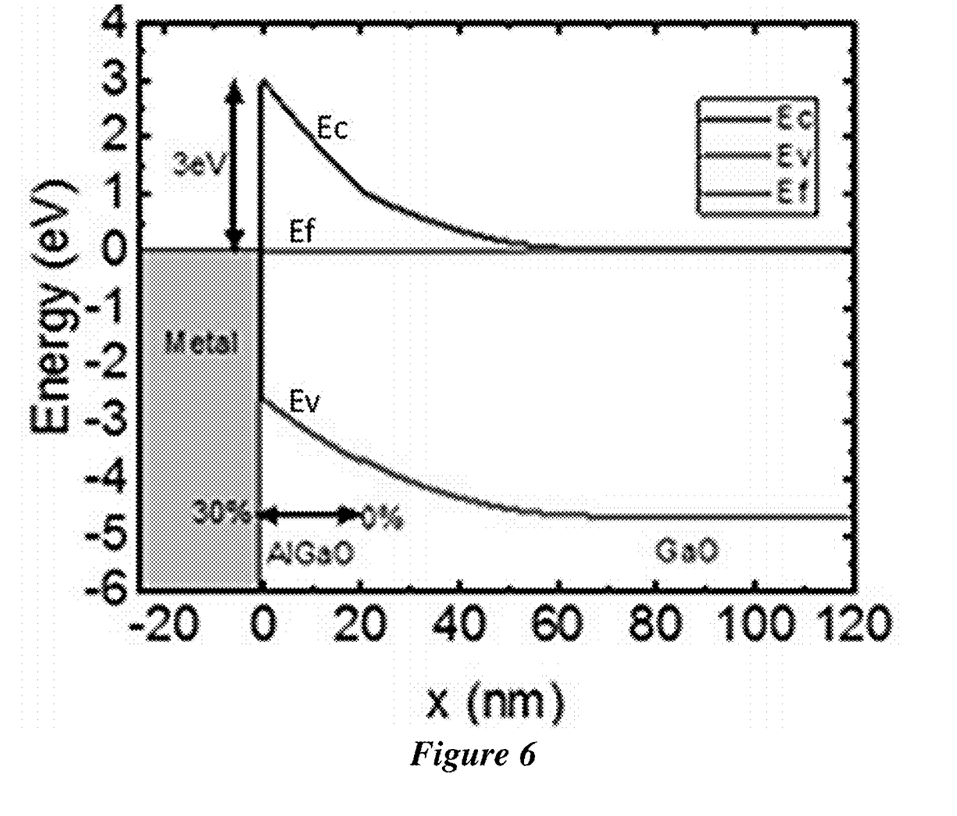
FIG. 6. Band diagram assuming a 3 eV barrier using a composition graded $(Al_xGa_{1-x})_2O_3$ device as shown in FIG. 5.

An example $(Al_xGa_{1-x})_2O_3/Ga_2O_3$ device structure is shown in FIG. 5 with a corresponding band diagram assuming a 3 eV barrier using high composition graded $(Al_xGa_{1-x})_2O_3$ shown in FIG. 6.

Figure 7:
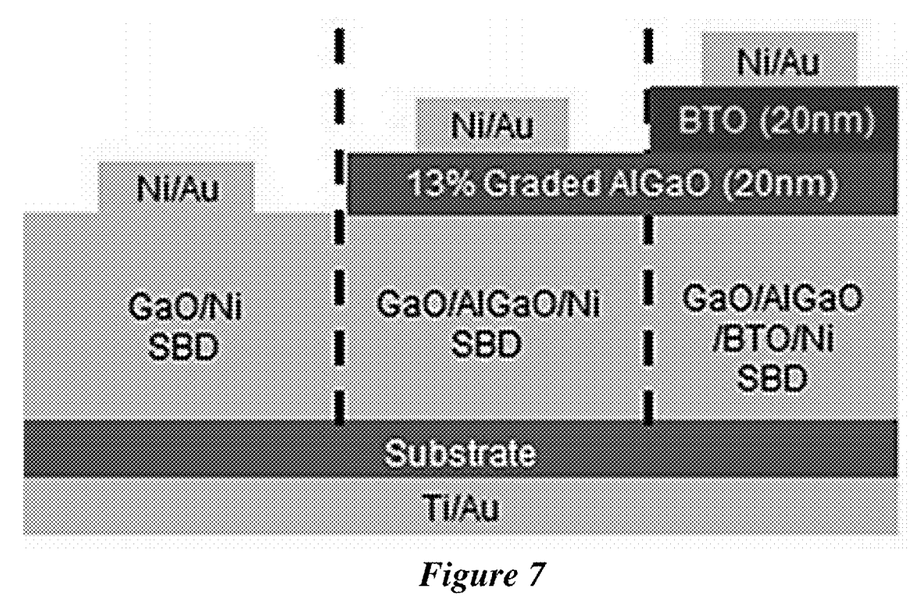
FIG. 7. An example set of device structures.
Figure 8:
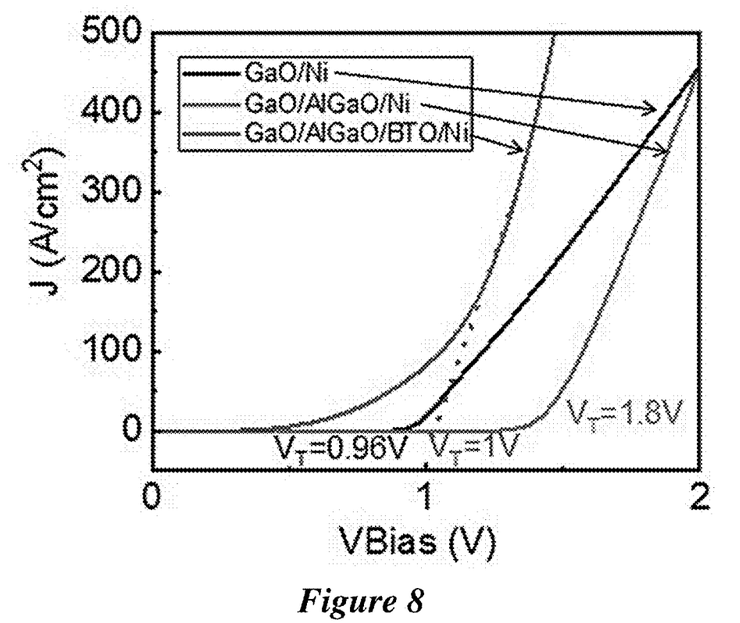
FIG. 8. Forward IV plot for the device structures shown in FIG. 7.
Figure 9:
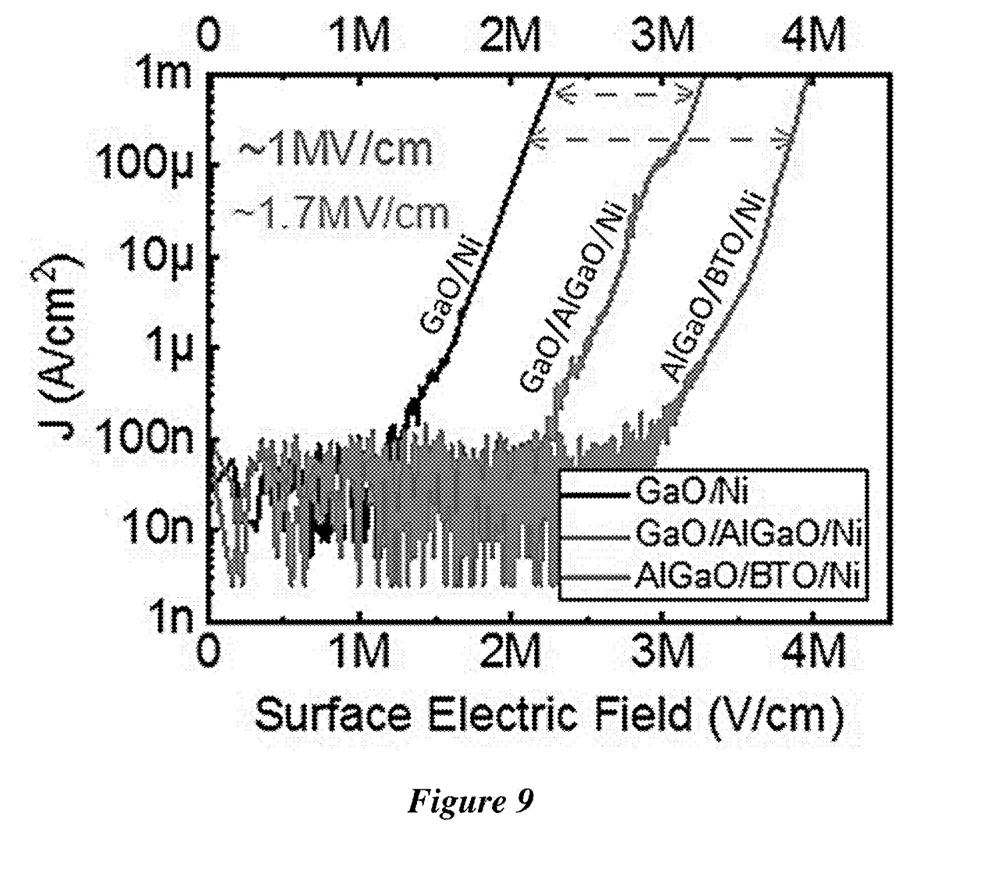
FIG. 9. Reverse leakage current plot with surface electric field for the device structures shown in FIG. 7.

Experiments were performed to investigate the AlGaO surface barrier engineering (FIG. 7-FIG. 9). A 20 nm linearly graded AlGaO cap layer was grown by MOCVD and compared to uniformly doped GOX control sample. Reverse breakdown measurements show that AlGaO cap results in increase surface electric field at breakdown. Addition of sputtered extreme-k $BaTiO_3$ layer results in further improvement in breakdown.

Example 2

Described herein are AlGaO/GaO structures (where AlGaO refers to $(Al_xGa_{1-x})_2O_3$ and GaO refers to $Ga_2O_3$).

Figure 10:
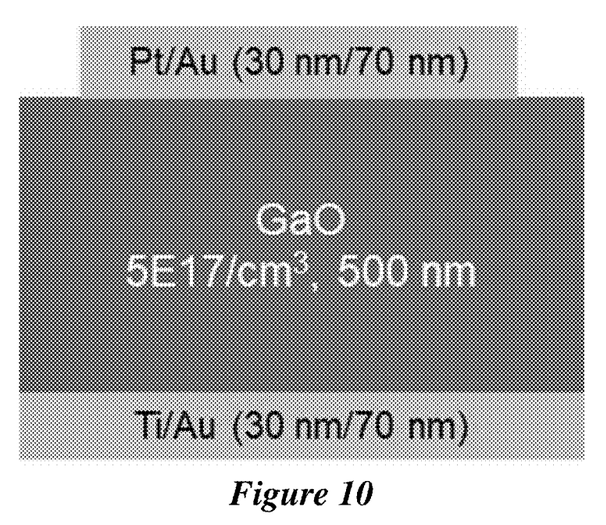
FIG. 10. An example GaO device structure.
Figure 11:
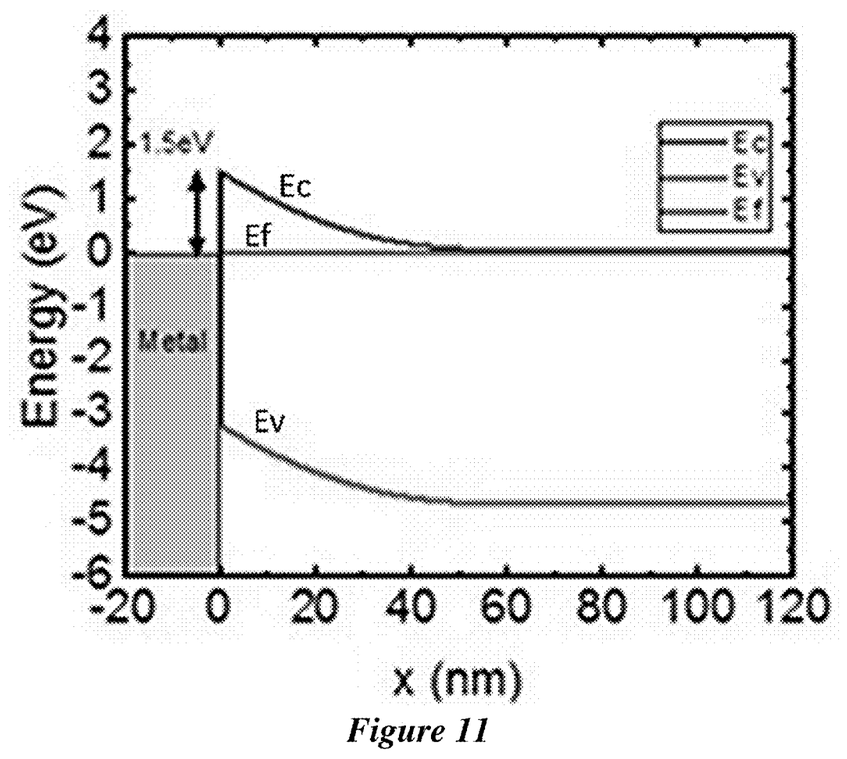
FIG. 11. Band diagram corresponding to the example GaO device shown in FIG. 10.

An example GaO device structure is shown in FIG. 10 with a corresponding band diagram shown in FIG. 11.

Figure 12:
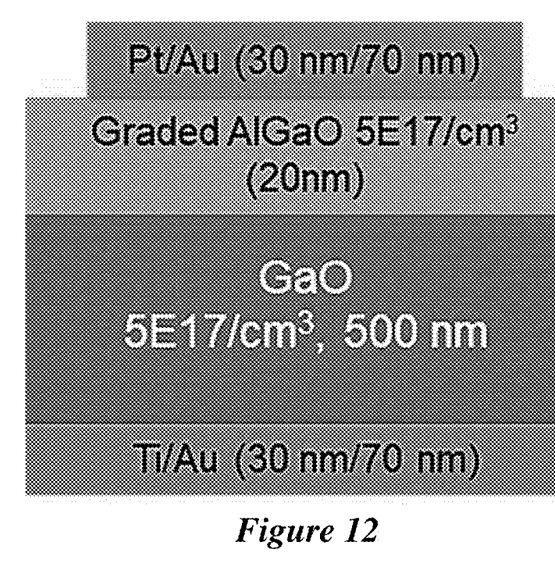
FIG. 12. An example AlGaO/GaO device structure.
Figure 13:
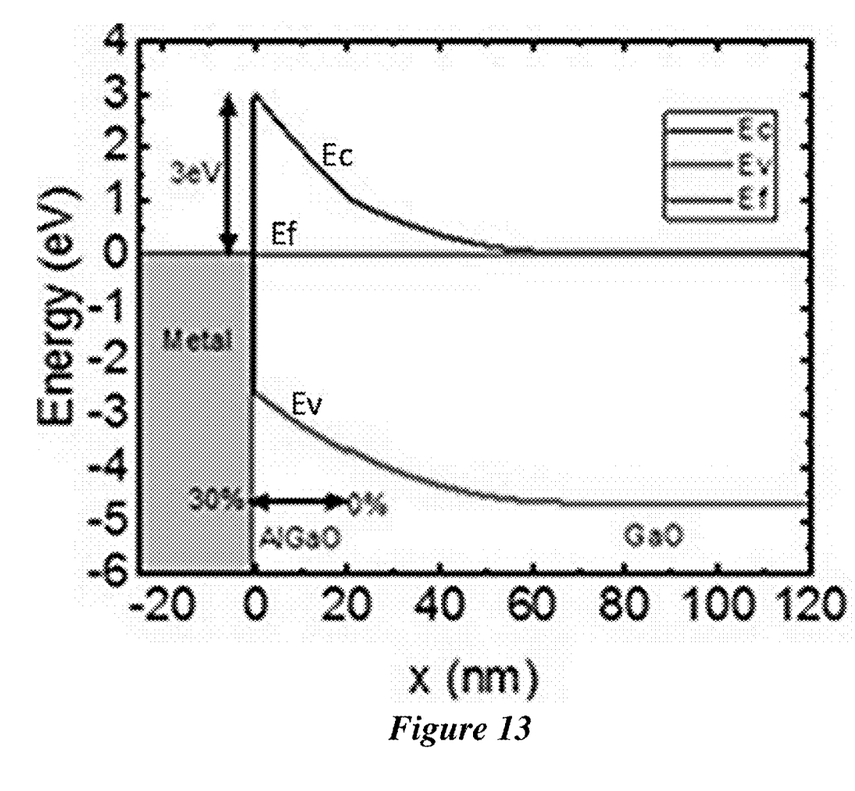
FIG. 13. Band diagram corresponding to the AlGaO/GaO device shown in FIG. 12.

An example AlGaO/GaO device structure is shown in FIG. 12 with a corresponding band diagram shown in FIG. 13.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A device comprising:
   a first electrode layer;
   a first semiconductor layer comprising a first semiconductor material having a first bandgap;
   a second semiconductor layer having a top surface, a bottom surface, and a thickness, the thickness being the average dimension from the top surface to the bottom surface;
   wherein the second semiconductor layer comprises a second semiconductor material that varies across the thickness from the bottom surface to the top surface, such that the second semiconductor material has a compositional gradient with thickness from an initial composition having an initial band gap at the bottom surface to a final comparison having a final bandgap at the top surface, such that the second semiconductor layer has a bandgap that varies with thickness from an initial bandgap at the bottom surface to a final bandgap at the top surface, wherein the final bandgap is greater than the initial bandgap, and the final bandgap is greater than the first bandgap;
   an optional dielectric layer; and
   a second electrode layer;
   wherein the first semiconductor layer is disposed on top of and in physical contact with the first electrode layer;
   wherein the second semiconductor layer is disposed on top of and in physical contact with the first semiconductor layer, such that bottom surface of the second semiconductor layer is disposed on and in physical contact with the first semiconductor layer and the first semiconductor layer is disposed between and in physical contact with the first electrode layer and bottom surface of the second semiconductor layer;
   when the optional dielectric layer is present, then:
   the optional dielectric layer is disposed on top of an in physical contact with the second semiconductor layer, such that the second semiconductor layer is disposed between and in physical contact with the first electrode layer and the optional dielectric layer, the top surface of the second semiconductor layer being in physical contact with the optional dielectric layer and the bottom surface of the second semiconductor layer being in physical contact with the first semiconductor layer; and
   the second electrode layer is disposed on top of and in physical contact with the optional dielectric layer, such that the optional dielectric layer is disposed between and in physical contact with the second electrode layer and the second semiconductor layer; and
   when the optional dielectric layer is absent, then:
   the second electrode layer is disposed on top of an in physical contact with the second semiconductor layer, such that the second semiconductor layer is disposed between and in physical contact with the second electrode layer and the first semiconductor layer, the top surface of the second semiconductor layer being in physical contact with the second electrode layer and the bottom surface of the second semiconductor layer being in physical contact with the first semiconductor layer.

2. The device of claim 1, wherein the first electrode layer comprises a Schottky contact layer.

3. The device of claim 1, wherein the first semiconductor material comprises $Ga_2O_3$, GaN, SiC, SnO, InP, or a combination thereof.

4. The device of claim 1, wherein the first semiconductor material comprises $Ga_2O_3$.

5. The device of claim 1, wherein the first semiconductor layer has an average thickness of from 1 nm to 500 μm.

6. The device of claim 1, wherein the first semiconductor layer has an average thickness of from 1 nm to 1 μm.

7. The device of claim 1, wherein the second semiconductor material comprises $(Al_xGa_{1-x})_2O_3$ wherein x is from 0 to 1.

8. The device of claim 7, wherein x varies along the thickness the second semiconductor material from a first value to a second value, the second value being greater than the first value.

9. The device of claim 1, wherein the second semiconductor material comprises $(Al_xGa_{1-x})_2O_3$ wherein x is from 0.25 to 1.

10. The device of claim 1, wherein the compositional gradient of the second semiconductor material comprises a linear gradient, a stepped gradient, an exponential gradient, a logarithmic gradient, or a combination thereof.

11. The device of claim 1, wherein the compositional gradient of the second semiconductor material comprises an exponential gradient, a logarithmic gradient, or a combination thereof.

12. The device of claim 1, wherein the thickness of the second semiconductor layer is from 1 nm to 1000 nm.

13. The device of claim 1, wherein the thickness of the second semiconductor layer is 1 nm to 100 nm.

14. The device of claim 1, wherein the optional dielectric layer is present.

15. The device of claim 14, wherein the optional dielectric layer has an average thickness of from 1 nm to 20 μm.

16. The device of claim 14, wherein the optional dielectric layer comprises $BaTiO_3$.

17. The device of claim 1, wherein the optional dielectric layer is absent.

18. The device of claim 1, wherein the second electrode layer comprises an Ohmic contact layer.

19. A method of making the device of claim 1, wherein the method comprises depositing, in any order, the first electrode layer, the first semiconductor layer, the second semiconductor layer, the optional dielectric layer (when present), and the second electrode layer.

* * * * *